(12) United States Patent
Ulrici et al.

(10) Patent No.: US 7,225,692 B2
(45) Date of Patent: Jun. 5, 2007

(54) INTEGRATED SYSTEM FOR ATTACHMENT AND CONNECTION OF A SENSOR

(75) Inventors: Christophe Ulrici, Cran-Gevrier (FR); Cathy Noury, Annecy (FR); Fabien Corlet, Annecy (FR)

(73) Assignee: Timken US Corporation, Torrington, CT (US)

( * ) Notice: Subject to any disclaimer, the term of this patent is extended or adjusted under 35 U.S.C. 154(b) by 532 days.

(21) Appl. No.: 10/630,890

(22) Filed: Jul. 30, 2003

(65) Prior Publication Data
US 2004/0109623 A1 Jun. 10, 2004

(30) Foreign Application Priority Data
Aug. 7, 2002 (FR) ................... 02 10052

(51) Int. Cl.
*G01M 13/04* (2006.01)
*F16C 41/00* (2006.01)

(52) U.S. Cl. .................. 73/866.5; 73/494; 384/448

(58) Field of Classification Search ............... 73/866.5, 73/865.9, 493–494; 384/448
See application file for complete search history.

(56) References Cited

U.S. PATENT DOCUMENTS

| | | | | |
|---|---|---|---|---|
| 5,296,805 A | * | 3/1994 | Clark et al. | 384/448 X |
| 5,756,894 A | | 5/1998 | Paolo et al. | |
| 5,873,658 A | * | 2/1999 | Message et al. | 384/448 |
| 5,920,193 A | * | 7/1999 | Tola et al. | 384/448 X |
| 5,938,346 A | * | 8/1999 | Ouchi | 384/448 |
| 6,045,267 A | * | 4/2000 | Merklein et al. | 384/448 |
| 6,203,204 B1 | | 3/2001 | Carmichael | |
| 6,227,710 B1 | * | 5/2001 | Message et al. | 384/448 |
| 6,422,075 B1 | | 7/2002 | Foster et al. | |
| 6,570,375 B2 | * | 5/2003 | Stroeters et al. | 384/448 X |
| 6,796,713 B2 | * | 9/2004 | Landrieve | 384/448 |
| 6,821,021 B2 | * | 11/2004 | Message et al. | 384/448 |
| 7,014,368 B2 | * | 3/2006 | Morita et al. | 384/448 |
| 2002/0181813 A1 | * | 12/2002 | Beauprez | 384/448 |
| 2003/0011358 A1 | * | 1/2003 | Karpinski | 384/448 X |
| 2005/0235513 A1 | * | 10/2005 | Niarfeix | 33/645 |

FOREIGN PATENT DOCUMENTS

| | | | | |
|---|---|---|---|---|
| CA | 2249914 A1 | * | 4/1999 | |
| EP | 401464 B1 | * | 12/1993 | |
| EP | 869365 A1 | * | 10/1998 | |
| JP | 02225823 A | * | 9/1990 | 384/448 |
| JP | 04004313 A | * | 1/1992 | 384/448 |
| JP | 2000221203 | | 8/2000 | |
| WO | WO 200155731 A1 | * | 8/2001 | |
| WO | WO 200220284 A2 | * | 3/2002 | |

* cited by examiner

Primary Examiner—Thomas P. Noland
(74) Attorney, Agent, or Firm—Michael Best & Friedrich LLP (57) ABSTRACT

This invention concerns a system for the attachment of an information sensor opposite to, and at an air gap's distance from, the coder of a bearing, with the system including a cap to be associated with a ring that at least partly covers the coder, where, in combination, the cap includes at least one device for attachment of the sensor to the internal surface of the cap and one device for electrical connection of the sensor. The invention also concerns a sensor designed to be attached to such a system, an ensemble formed by the attachment system and the associated sensor, as well as a bearing equipped with such an ensemble.

24 Claims, 6 Drawing Sheets

INTEGRATED SYSTEM FOR ATTACHMENT AND CONNECTION OF A SENSOR

BACKGROUND

This invention concerns a system for the attachment of a sensor that senses information opposite to, and at an air gap's distance from, the coder of a bearing, a sensor designed to be attached to such a system, an ensemble formed by the attachment system and the sensor together, as well as a bearing equipped with such an ensemble.

When bearings of this kind are equipped with a sensor of the rotation speed, angular position, and/or rotation direction, they can be used in particular for automobile wheels that are equipped with an antilock system for said wheels, with the information then being used by a computer to help with braking.

One of the problems that arises with bearings of this kind concerns the attachment of the sensor opposite, and at an air gap's distance from, the coder that generates the impulses that the sensor is to detect. In fact, particularly in magnetic detection technologies, the control of the air gap directly governs the quality of the signal detected.

It is known, for example from document EP-0743526, that a sensor can be integrated into a detachable connector, with said connector being designed for placement in a housing created in a cap associated with the bearing.

This type of solution has numerous disadvantages. In fact, the relative position of the sensor with respect to the coder, and therefore the control of the air gap, depends on manufacturing tolerances of the connector and the housing as well as the relative positioning of these two elements. In a safety application such a braking assistance, the mechanical tolerances do not offer sufficient precision to control the air gap.

In addition, since the connector is detachable, the reliability of the attachment, particularly in a demanding environment such as that of vehicle wheels, cannot be guaranteed, particularly in the case of impact.

Furthermore, since the cap consists of a housing in which the connector is placed, the cap is not sufficiently reliable in waterproofing or protection of the coder.

The system described above also makes it necessary to adapt the size of the cap/connector/sensor ensemble to each bearing size, which runs counter to the standardization pressures in the automobile industry.

SUMMARY

The invention seeks to overcome these disadvantages by offering, in particular, a system for the attachment of a sensor to a wheel that integrates, in a single piece, the functions of fixation and electrical connection of said sensor, and does so with optimal watertightness and standardization of the means of attachment and connection, as well as offering a sensor for a set of wheel sizes.

For this purpose, and in a first aspect, the invention offers a system for the attachment of a sensor of information opposite to, and at an air gap's distance from, the coder of a bearing, with said system consisting of a cap to be associated with a ring of the bearing by covering the coder, at least partly, and in which, in combination, the cap consists of at least one device for attachment of the sensor on the internal surface of said cap and a device for the electrical connection of said sensor with a unit designed to process the information detected, with said connection device consisting of an internal means of connection constructed to interact with complementary means of connection provided on the sensor and, connected to said internal means, an external means of connection constructed to allow for reading of the information detected.

A second aspect of this invention offers a sensor designed to be attached to the cap of such an attachment system, with said sensor consisting of complementary means of electrical connection that are used, when the sensor is attached to the cap, to cooperate with the internal means of electrical connection of the cap, establishing the connection between said sensor and the unit by means of the external connection means.

In a third aspect, the invention offers an ensemble consisting of such an attachment system and offers a sensor of this kind attached and connected to the cap of said system.

In a fourth aspect, the invention offers a bearing of the type that consists of a fixed ring, a turning ring, and rolling elements between said rings, in which an impulse generating coder is associated with the turning ring, with said bearing being characterized in that it is equipped with such an ensemble, with the cap of said ensemble being associated with the fixed ring.

BRIEF DESCRIPTION OF THE DRAWINGS

Other objects and advantages of the invention will become apparent in the following description, with reference to the attached illustrations, in which.

DETAILED DESCRIPTION OF THE PREFERRED EMBODIMENTS

In relation to the figures, we describe a system for attachment of a sensor of information 1 opposite to, and at an air gap's distance from, the coder 2 of a bearing, with said system including a cap 3 to be associated with a ring 4 of said bearing.

In the mode of embodiment represented, the cap 3 is formed from an annular piece including a radial disk 3a and an axial cylindrical skirt 3b extended by an axial cylindrical projecting ledge 3c for coupling the system to the bearing ring 4.

In the description, the terms "external" and "internal" are defined with respect to the sides of the cap 3 respectively opposite and across from the bearing when said cap is mounted on said bearing, the term "axial" is defined with respect to a plane parallel to the axis of rotation of the bearing, and the term "radial" is defined with respect to a plane perpendicular to this axis of rotation.

The cap 3 is constructed to at least partly receive the coder 2 in order to protect it, particularly against splashes of water and mud that may occur in an application of the bearing for turning a vehicle wheel.

In relation to FIGS. 1–9, we describe attachment systems including an attachment device of the sensor 1 on the internal surface of the cap 3 and a device for electrical connection of said sensor with a unit (not shown) designed to process the information detected. The connection device includes an internal means of connection constructed to interact with complementary means of connection provided on the sensor 1 and, connected to said internal means, an external means of connection constructed to permit reading of the information detected.

Thus, the attachment system integrates, in a single piece, on the one hand the means of attachment of the sensor, and on the other hand the means of electrical connection, which makes it possible to solve the problems of the prior art, which are related to the use of two mechanically interacting elements.

In addition, the cap 3 can be obtained easily and at a low cost, for example, from plastic molding.

Figure 3:
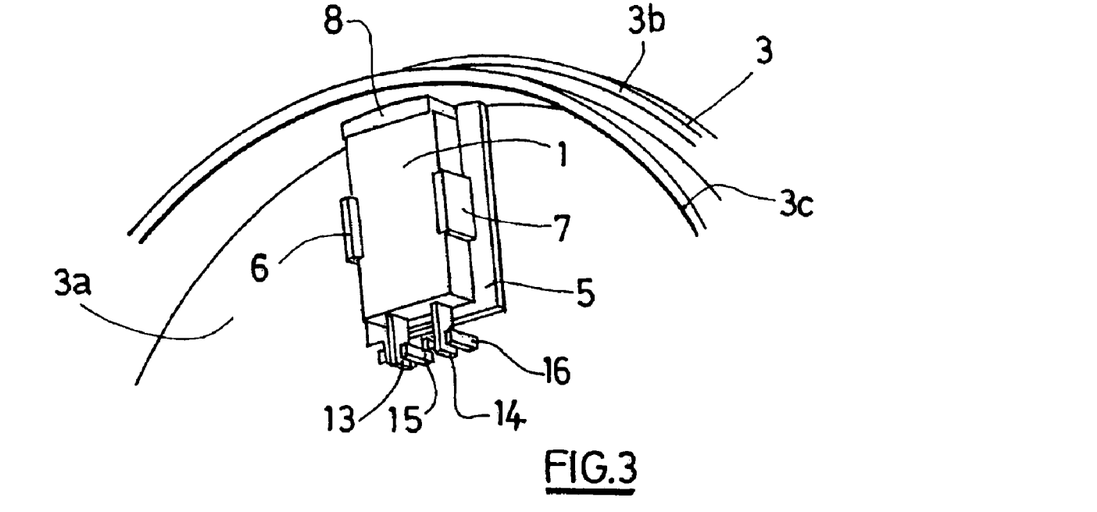
FIG. 3 is a partial view of FIG. 1 showing the sensor attached to the cap to form an ensemble according to one mode of embodiment.
Figure 4:
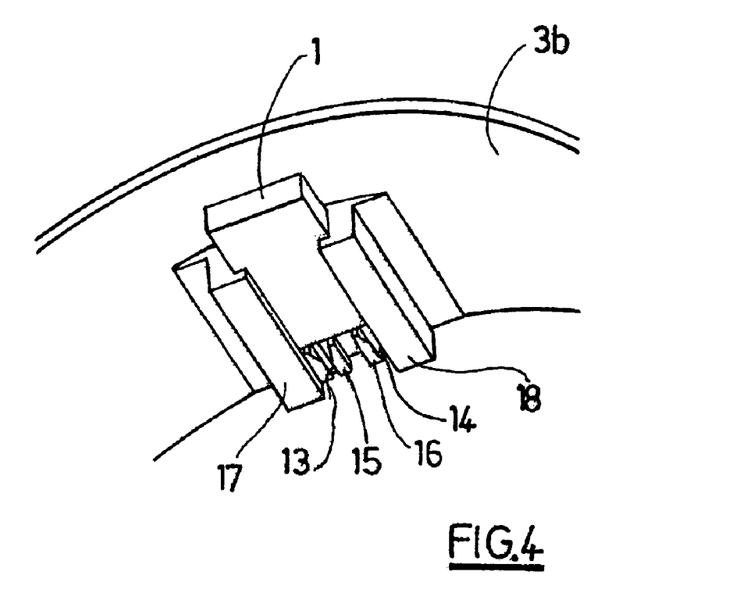
FIG. 4 is a view analogous to FIG. 3, showing the ensemble in another mode of embodiment.
Figure 5:
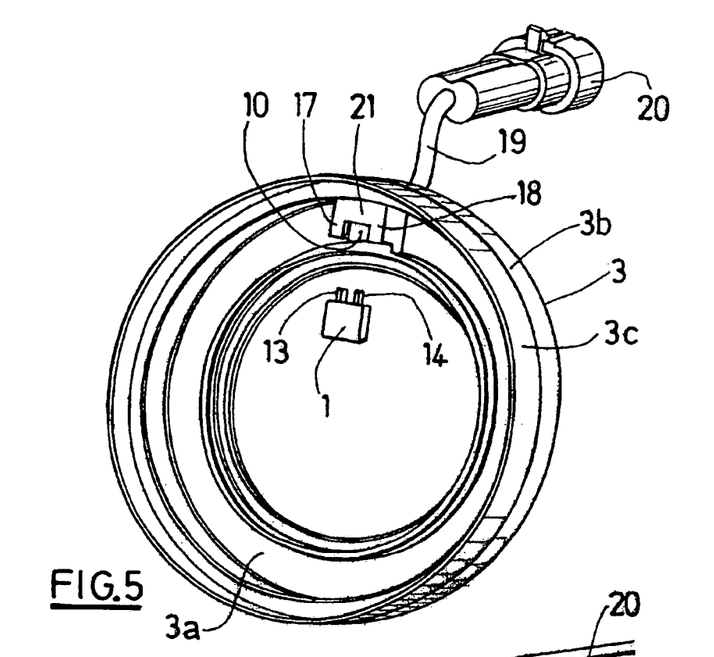
FIG. 5 is a front perspective view of an attachment system in another mode of embodiment, with said figure also showing the sensor before it is attached to the cap.
Figure 6:
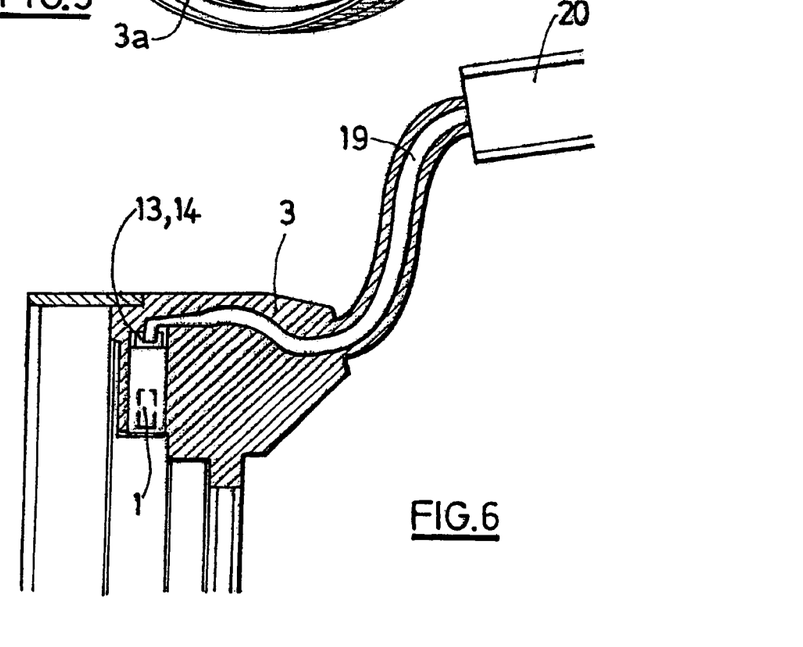
FIG. 6 is a partial cross-sectional view of FIG. 5 along a radial plane cutting through the attachment device, with the sensor being attached to the cap.
Figure 7:
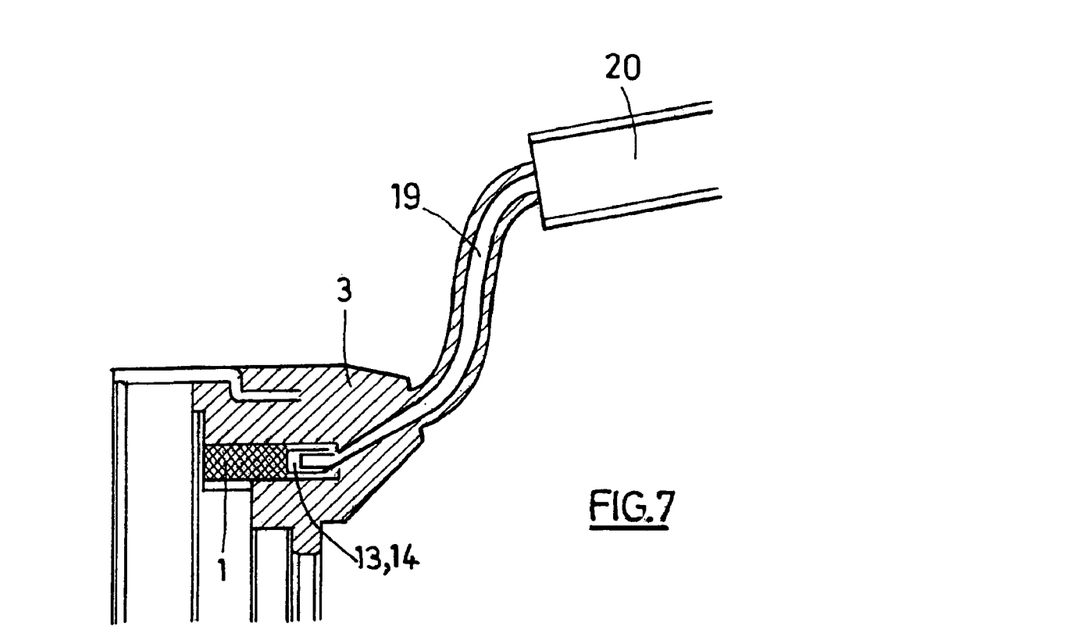
FIG. 7 is a view analogous to FIG. 6, showing another mode of embodiment of the attachment of the sensor in the attachment system.

FIGS. 1–4 show an attachment system in which the disk 3a is full, which typically corresponds to an attachment system for a non-driving wheel of a vehicle, whereas in FIGS. 5–7, the disk 3b includes a central bore constructed to allow passage of a transmission bowl from a driving wheel.

Figure 1:
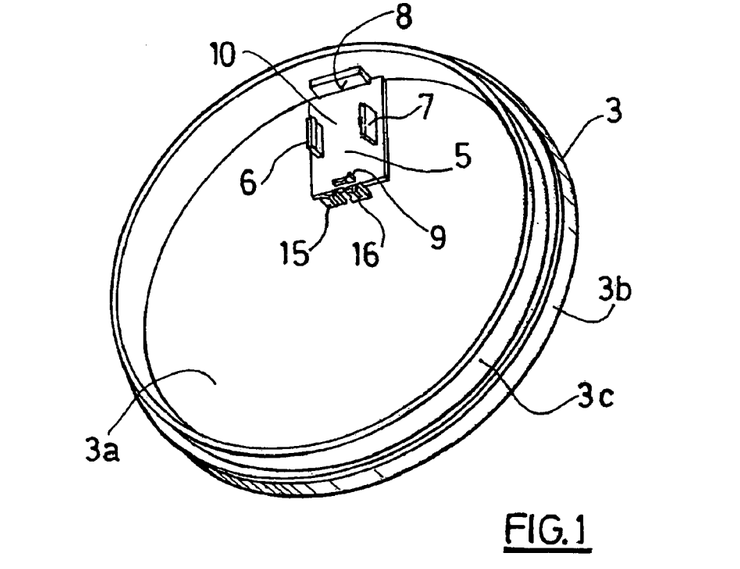
FIGS. 1 and 2 are front and back perspective views, respectively, of an attachment system in one mode of embodiment.
Figure 2:
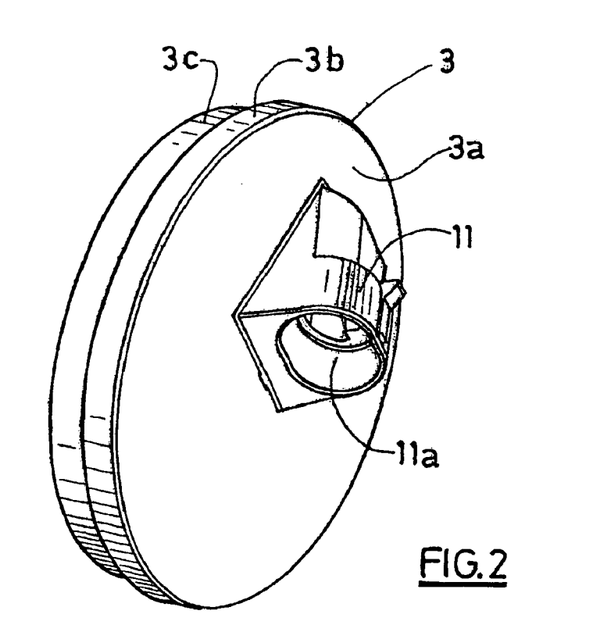

In FIGS. 1–3, the attachment device is provided on the internal surface of the disk 3a to permit facial reading of the information. The attachment device includes a support plate 5 associated with the disk 3a, with said plate having four axial splines 6–9 forming among themselves an open housing 10 sized to receive the sensor 1. For this purpose, two opposite splines, 6 and 7, are elastic and are constructed to allow for clipping of the sensor 1 to the inside of said housing. As a variant, the plate 5 and the splines 6–9 can be molded in a single piece with the disk 3a.

FIG. 2 shows the external means of connection that include a connector 11 on the external face of the disk 3a, with said connector being, for example, molded on said external face in such a way that it does not alter the watertightness conferred by the cap 3.

The connector 11 is constructed to reversibly receive a plug from the unit that processes the information detected. For this purpose, the connector 11 includes a housing 11a in which connection pins 11b are electrically linked to the internal means of connection.

Therefore, the attachment system makes it possible, on the one hand, to detect information from the internal side of the cap 3 and, on the other hand, to make this information accessible from the external side of the cap 3. This embodiment is particularly advantageous in that it allows for limiting the integration constraint of the sensor 1 while providing optimal watertightness between the inside and outside of the bearing.

FIG. 3 shows a sensor 1 attached to the attachment system of FIG. 1. The sensor 1 includes the complementary means of electrical connection that are intended, once the sensor 1 is attached to the cap 3, to cooperate with the internal means of electrical connection of the cap 3, establishing the connection between said sensor and the unit by the external connection means.

The sensor 1 includes a body made of plastic material that is parallelepiped in shape, in which the means of detection 33 are molded with the complementary means of connection projecting from said body.

In FIG. 3, the complementary means of connection are formed of two lugs 13, 14 that are each designed, when the sensor 1 is attached to the cap 3, to engage in two connectors 15, 16 in U-form, the base of which is associated on the internal surface of the cap 3, and of which the two branches are constructed to receive and connect, respectively, a connection lug 13, 14. Because of the forced introduction of the lugs 13, 14 into the connectors 15, 16, this embodiment also makes it possible to improve the attachment of the sensor 1 in the housing 10. In a variant, the connectors 15, 16 can be partially coated by the plastic of the cap 3 to protect them from outside pollution.

In relation to FIG. 4, we describe another mode of embodiment of the attachment system in which the means of attachment include two runners 17, 18 intended to cooperate with complementary forms provided on the sensor 1, specifically the opposite edges of said sensor, which is analogous to the one represented on FIG. 3. The internal means of connection also include connectors 15, 16 in a U-shape that are in a horizontal position to assure receipt of the lugs 13, 14 when the sensor 1 is conveyed into the runners 17, 18. In addition, in the mode of embodiment of FIG. 4, the attachment device is associated with the internal surface of the skirt 3b to allow for radial reading of the information.

In relation with FIGS. 5–7, we describe the attachment of a sensor 1 analogous to the one described previously in an attachment system including an external means of connection formed from a wire 19 molded in the cap 3, with the end of said wire opposite to the external means of connection being provided with a connector 20. Because of the molding, this embodiment also allows access to the information on the external surface of the cap 3 without altering the watertightness of said cap.

FIGS. 5 and 6 show that the attachment device is provided on its internal surface with the disk 3a to allow for facial reading of the information, whereas in FIG. 7, the attachment device is provided on the internal surface of the skirt 3b to allow for a radial reading of the information.

As in the preceding mode of embodiment, the attachment device includes a housing 10 in which the sensor 1 is inserted by sliding so that it will be attached and connected to the external means of connection. In FIG. 5, the two runners 17, 18 are partially connected to each other to form a wall 21 that partly closes the housing 10.

Figure 8:
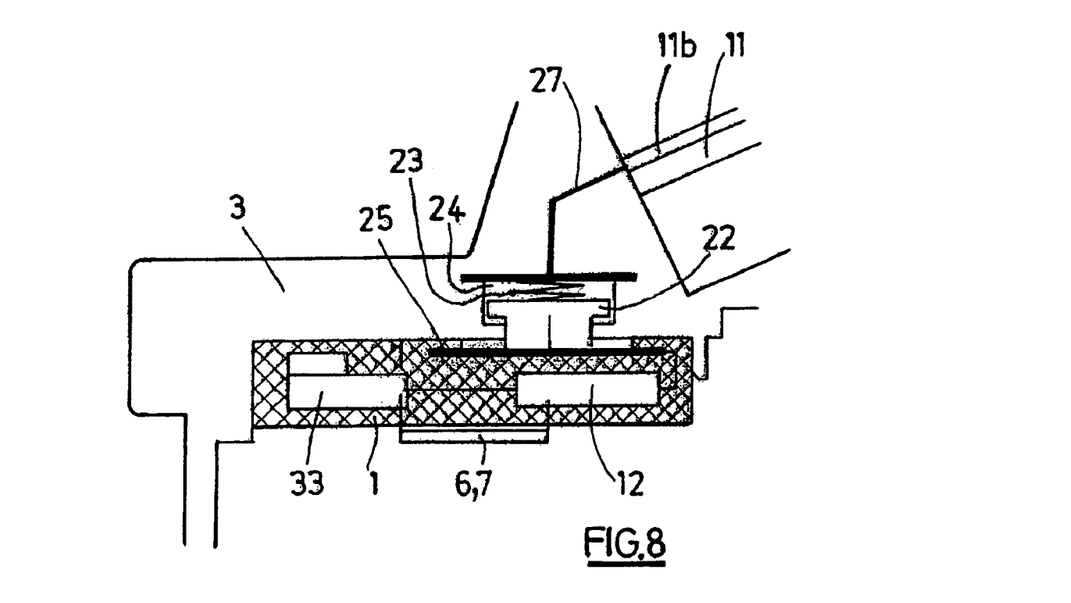
FIG. 8 is a cross-sectional diagram showing a means of embodiment of the connection device of the attachment system as well as complementary means of sensor connection.

FIG. 8 shows the internal means of connection including two contactors 22 mounted in relay by means of a spring 23, in a housing 24 on the internal surface of the skirt 3b. Thus, under the action of the attachment of the sensor 1, the contactors 22 pass from a resting position, in which the contactor 22 blocks the housing 24, to a connection position. This embodiment improves the watertightness at the level of the contactors 22, on the one hand, and the electrical contact between the sensor 1 and the internal means of connection, on the other hand.

The complementary means of connection are formed form two plates 25 that are designed, when the sensor 1 is attached to the cap 3, to rest on the contactor 22. For this purpose, the plates 25 are molded in the body of the sensor 1 to be associated with it and to leave one of their surfaces free.

Figure 9:
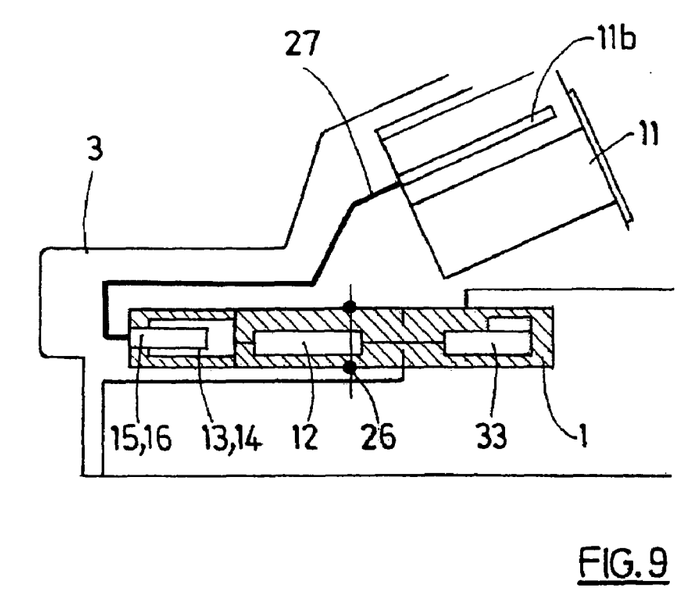
FIG. 9 is a diagram analogous to FIG. 8, according to another mode of embodiment of the connection device and the sensor.

FIG. 9 shows a sensor 1, of which the body is provided with an O ring 26 to provide watertightness when the sensor 1 is placed in the housing 10 of the attachment device.

In the embodiments of FIGS. 8 and 9, the external means of connection are formed form a connector 11, of which the pins 11*b* are connected by a wire 27 to the internal means of connection.

Figure 10:
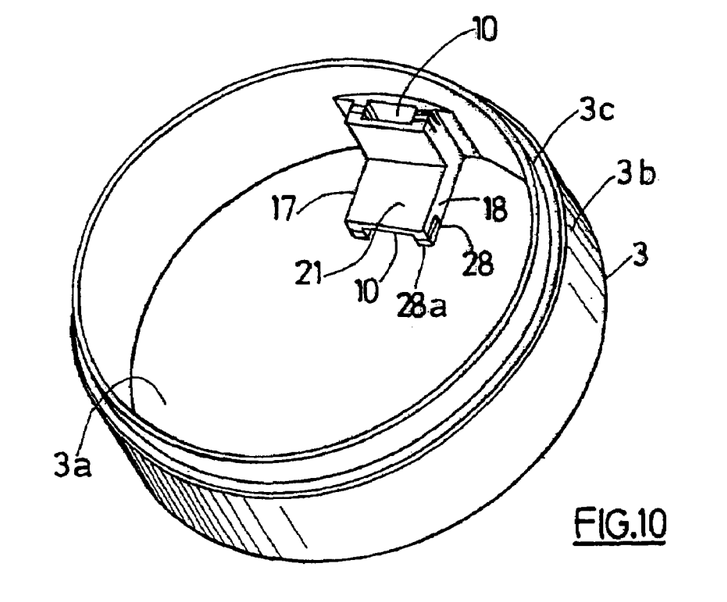
FIG. 10 is a front perspective view of an attachment system in one mode of embodiment.
Figure 11:
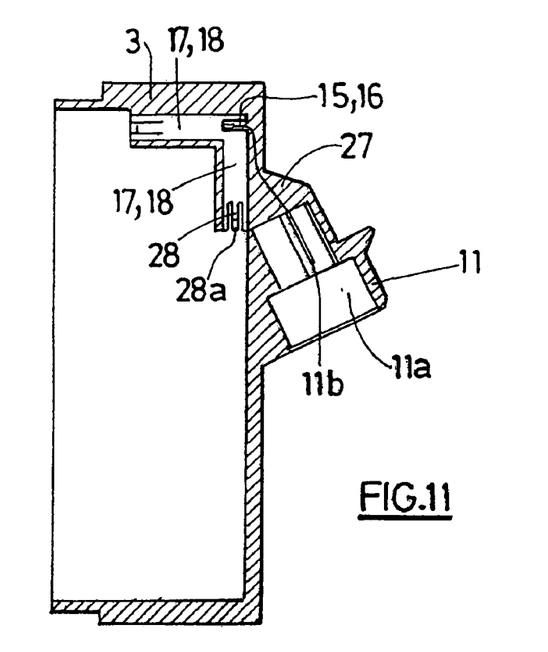
FIG. 11 is a longitudinal cross-sectional view of FIG. 10 on a radial plane cutting through the attachment device.

FIGS. 10 and 11 show an attachment system including two attachment devices that are provided, respectively, on the internal surface of the disk 3*a* and on the internal surface of the skirt 3*b*, with the connection device being constructed to permit the connection of the sensor 1 placed in one or the other of the attachment devices.

This embodiment, by providing two housings 10 placed perpendicular to each other, provides for facial and radial reading of the information, with the choice between these two modes of reading being made when the sensor 1 is attached to the system.

In the mode of embodiment represented, each of the means of attachment includes two runners 17, 18, each provided with an elastic spline 28 equipped with a projection 28*a* near its end, with said splines being intended, after the sensor 1 is slid into place, to clip it.

Figure 12:
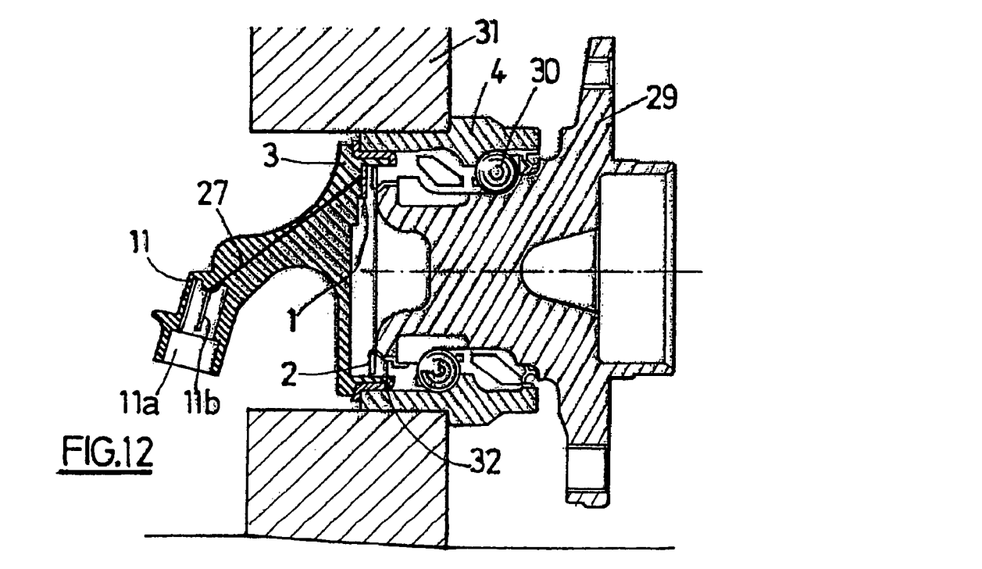
FIG. 12 is a longitudinal cross-sectional view of a bearing according to one mode of embodiment.

FIG. 12 shows a bearing of the type that includes a fixed external ring 4, a turning internal ring 29, formed from the axle of a non-driving wheel of a vehicle, and rolling elements 30 placed between said rings, in which an impulse-generating coder 2 is associated with the turning ring 29. The bearing is equipped with an ensemble including an attachment system and a sensor 1, with the cap 3 of said ensemble being associated with the fixed ring 4, fitted into the bore of a fixed structure 31.

The coder 2 is formed of a multipolar magnetic ring on which multiple equally distributed North and South pole pairs are magnetized, with said coder being associated with the inside ring 29 by means of a framework 32 fitted onto said ring.

In a particular example, the sensor 1 includes sensitive elements 33 that are chosen from the group that includes the Hall-effect probes, the magneto resistances, and the giant magneto resistances, with said elements being molded in the sensor 1 with the adequate electronic means 12.

As a variant, it is also possible to use a topical technology by providing a coder 2 made up of a metal or glass target on which patterns are engraved, along with sensitive elements 33 formed from optical detectors.

In both cases, there is a known means of processing the information detected by the sensor 1 so that the rotation speed, the angular position, and/or rotation direction of the internal ring 29 with respect to the external ring 4, i.e., the wheel with respect to the ground, can be deduced from it.

Therefore, the bearing according to the invention is made perfectly watertight by the presence of the cap 3, which makes it possible, in particular, to protect the coder 2 from contamination. Moreover, the attachment of the sensor 1 opposite to and at an air gap's distance from, the coder 2 is accomplished in a particularly reliable manner. In addition, only the size of the cap 3 must be adjusted to the size of the bearing, and the sensor 1 as well as the attachment and connection devices can remain identical.

The invention claimed is:

1. A system for attachment of an information sensor opposite to, and at an air gap's distance from, a coder of a bearing, said system including:

a cap intended to be associated with a ring of said bearing and at least partly covering the coder, wherein the cap includes at least one device for attachment of the sensor to an internal surface of said cap, said attachment device being integral with the internal surface, and a device for electrical connection of said sensor with a unit designed to process the information detected, said connection device including an internal means of connection constructed to interact with complementary means of connection provided on the sensor, and said connection device further including an external means of connection connected to said internal means and constructed to permit reading of the information detected, wherein said cap consists of a single integrated piece.

2. A system according to claim 1, wherein the cap is formed from an annular piece including a radial disk and an axial cylindrical skirt that is extended by an axial cylindrical projecting ledge for fitting said system onto the bearing ring.

3. A system according to claim 2, wherein the disk includes a central bore.

4. A system according to claim 2, wherein the attachment device is provided on an internal surface of the disk or on an internal surface of the skirt.

5. A system according to claim 2, wherein two attachment devices are provided, respectively, on an internal surface of the disk and on an internal surface of the skirt, the connection device being constructed to permit connection of the sensor placed in one or the other of the attachment devices.

6. A system according to claim 1, wherein the attachment device includes a housing in which the sensor is to be attached, said housing including a means for attachment of said sensor.

7. A system according to claim 6, wherein each of the projections includes an elastic spline constructed to permit clipping of the sensor within the housing.

8. A system according to claim 6, wherein the means for attachment include two runners designed to cooperate with complementary forms provided on the sensor.

9. A system according to claim 8, wherein each runner includes an elastic spline provided with a projection near an end thereof, with said splines being designed to permit clipping of the sensor after it is positioned in the housing.

10. A system according to claim 1, wherein the internal means of connection include two connectors in a U-shape, each of the connectors constructed to receive and connect a respective connection lug provided on the sensor.

11. A system according to claim 1, wherein the internal means of connection include two contactors respectively mounted in a relay in a housing provided on the internal surface of the cap between a resting position in which the contactors seal the housing and a connection position, the passage from one position to the other being accomplished under the action of attachment of the sensor.

12. A system according to claim 1, wherein the external means of connection include a connector on an external face of the cap.

13. A system according to claim 1, wherein the external means of connection include a molded wire in the cap, an end of said wire opposite the internal means of connection being provided with a connector.

14. A sensor designed to be attached to the cap of an attachment system according to claim 1, wherein the sensor includes a complementary means of electrical connection designed to cooperate with the internal means of electrical connection of the cap after the sensor is attached to the cap, and to establish the connection between said sensor and the unit by means of the external means of connection.

15. A sensor according to claim 14, wherein the sensor includes a body of plastic material in which means of detection are molded with the complementary means of connection projecting from said body.

16. A sensor according to claim 15, wherein an O ring is placed around the body.

17. A sensor according to claim 14, wherein the sensor includes a body that is parallelepiped in shape.

18. A sensor according to claim 14, wherein the complementary means of connection are formed from two lugs designed to engage the internal means of connection after the sensor is attached to the cap.

19. A sensor according to claim 14, wherein the complementary means of connection are formed from two plates designed to rest on the internal means of connection when the sensor is attached to the cap.

20. A sensor according to claim 19, wherein the plates are molded in the body with each plate having a free surface.

21. An ensemble including an attachment system according to claim 1, and a sensor attached and connected to the cap of said system.

22. An ensemble according to claim 21, wherein the sensor is associated with the cap to allow radial reading of the information detected.

23. An ensemble according to claim 21, wherein the sensor is associated with the cap to allow a facial reading of the information detected.

24. An ensemble according to claim 21, wherein the bearing is of the type that includes a fixed ring, a turning ring, and rolling elements placed between said rings, wherein an impulse generating coder is associated with the turning ring, and wherein the cap of said ensemble is associated with the fixed ring.

* * * * *